Nov. 29, 1927.  1,651,327
G. J. DEAN
COTTON PLANTER
Filed Dec. 18, 1925  2 Sheets-Sheet 1
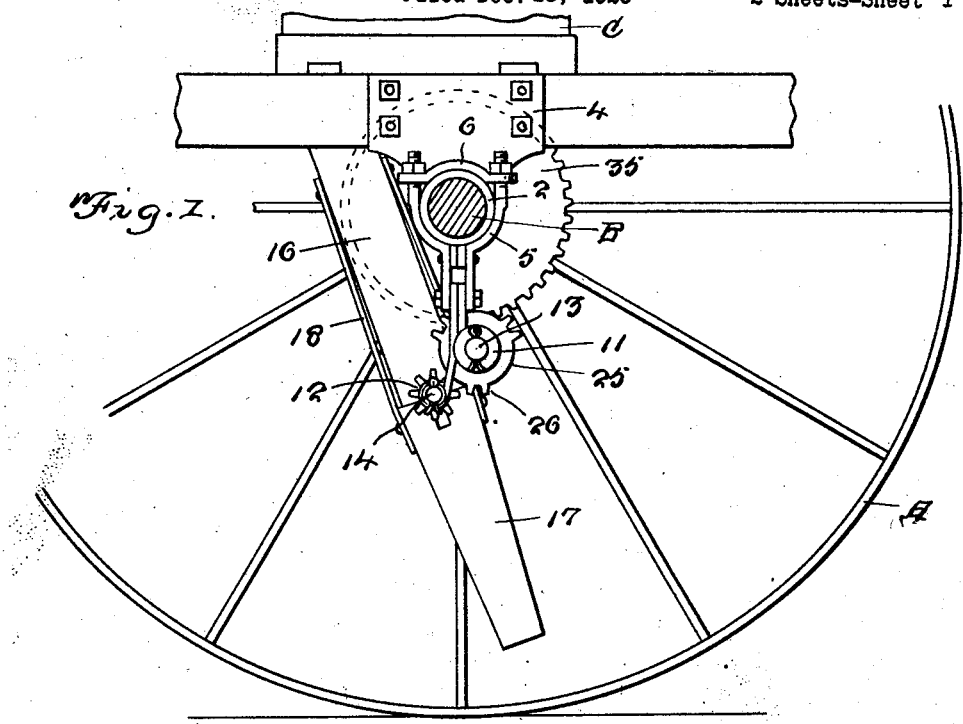
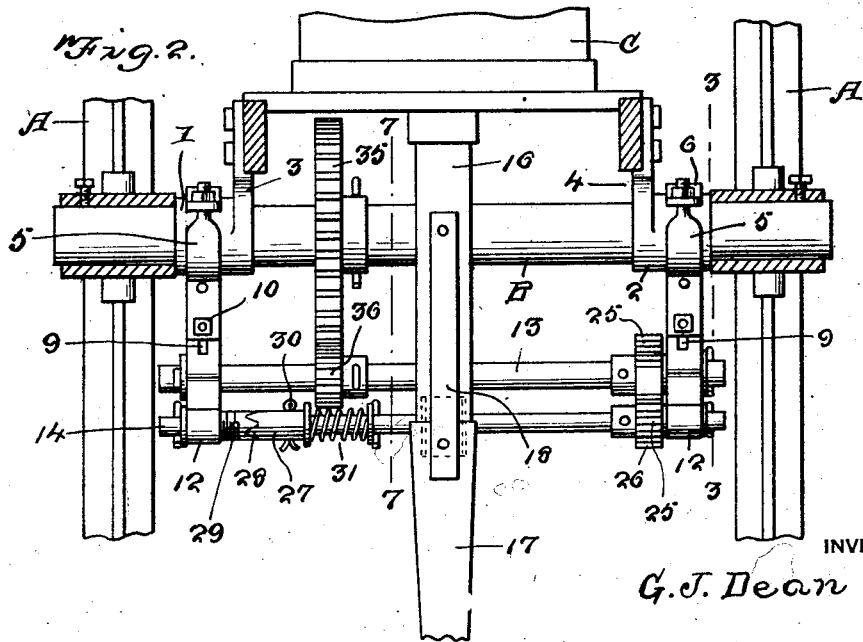
INVENTOR
G. J. Dean
BY Victor J. Evans
ATTORNEY Nov. 29, 1927.
G. J. DEAN
1,651,327
COTTON PLANTER
Filed Dec. 18, 1925          2 Sheets-Sheet 2
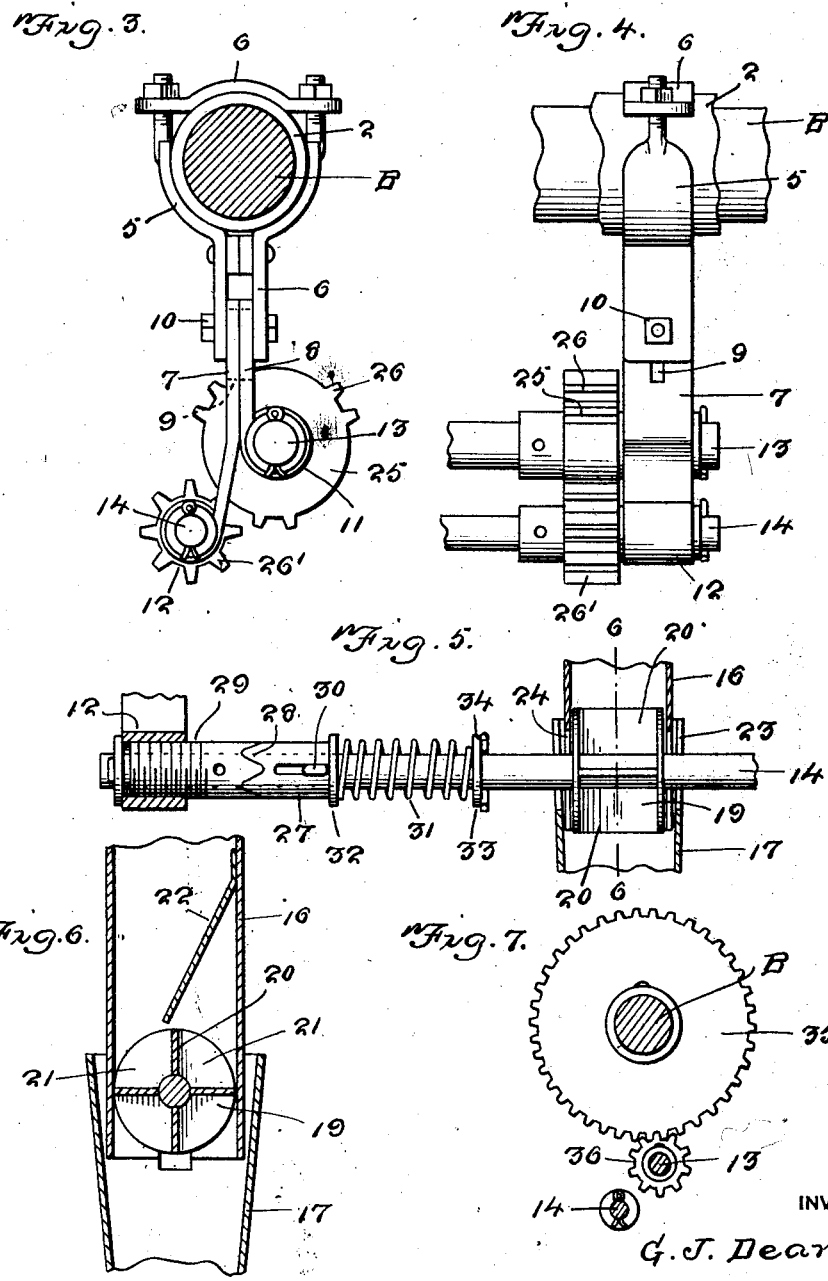
INVENTOR
G. J. Dean
BY Victor J. Evans
ATTORNEY Patented Nov. 29, 1927.

1,651,327

UNITED STATES PATENT OFFICE.

GEORGE J. DEAN, OF CAMPBELL, TEXAS.

COTTON PLANTER.

Application filed December 18, 1925. Serial No. 76,340.

This invention relates to improvements in cotton planters and its primary object is to provide a novel seed dropping mechanism therefor that is adapted to be detachably associated therewith so that the mechanism can be advantageously associated with various types of planters.

A further object is to provide a seed dropping mechanism for cotton planters that is adapted to accurately drop seed at any desired distance apart it being adjustable for that purpose.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a fragmentary vertical sectional view taken through the cotton planter and showing the improvement applied thereto.

Figure 2 is a similar view showing a rear elevation of the improvement.

Figure 3 is a sectional view taken on line 3—3 of Figure 2.

Figure 4 is a fragmentary elevation taken at right angles to Figure 3.

Figure 5 is a view partly in section and rear elevation to illustrate the immediate control means for the seed valve.

Figure 6 is a sectional view taken on line 6—6 of Figure 5.

Figure 7 is a sectional view taken on line 7—7 of Figure 2.

Referring to the drawings in detail the letter A indicates the ground engaging wheels of the cotton planter as shown and B the planter axle which has secured thereto the respective wheels as shown in Figure 2 of the drawings. Therefore it will be apparent that the axle rotates with the wheels.

Surrounding the axle B and arranged in contacting engagement with each of the hubs of the wheels A are sleeves 1 and 2 formed with arms 3 and 4 rising therefrom to support a frame which carries a seed box C which is of the usual construction.

Surrounding the sleeves 1 and 2 are the upper curved ends of clamps 5, the upper ends having stub bolts formed thereon for receiving cross plates 6 which are secured to said stub bolts through the medium of the nuts as clearly shown in Figure 3 of the drawings. The clamps 5 have depending portions 6 which are arranged in spaced relation as shown in Figure 3 and adjustably receive straps 7 and 8 which are slotted as at 9 to compensate for the adjustment and are held associated with said depending portion 6 by a bolt and nut connection 10. It will be noted from Figure 3 that the straps 7 are longer than the straps 8, and each of said straps 7 and 8 have formed on their lower ends bearings 11 and 12. The bearings 11 of each of the straps 8 being aligned for receiving a shaft 13 while the bearings of the straps 7 are likewise aligned to receive a shaft 14. One of the bearings of one of the straps 7 is threaded for a purpose which will be later apparent.

Depending from the seed box C is a seed tube 16 which is in communication therewith and has fixed to its lower end a seed boot 17 through the medium of a strip 18 which has its end secured to the seed tube and boot respectively as clearly shown in Figure 2 of the drawings. Fixed to the shaft 14 intermediate its ends and arranged for rotation in the lower end of the seed tube 16 is a seed valve 19 formed with partitions 20 for providing the seed compartments 21. Secured to the inner wall of the seed tube 16 and depending therefrom at an inclination so that its lower end terminates adjacent the central portion of the tube slightly above the seed valve is a deflecting plate 22 which is adapted to deflect the seeds to the respective compartments in the rotation of the seed valve as will be readily apparent. The seed tube and seed boot respectively has the meeting ends of its side walls provided with spaced parallel slots 23 and 24 so that they may be telescopically associated about the seed valve and shaft 14 as suggested in Figure 5. From this construction it will be apparent that they can be readily separated for proper inspection of the seed valve.

Secured to the shaft 13 adjacent one end thereof is a gear 25 which is formed with pairs of spaced teeth 26 arranged in equidistantly spaced relation with respect to each other as shown in Figure 1. The gear is adapted to mesh with the pinion 26 which is keyed or otherwise secured to the shaft 14, which is rotated through the instrumentality of the connection between the gear 25 and pinion 26. Surrounding the end of the shaft 14 opposite the pinion 26 is a sleeve 27 having teeth 28 adapted to mesh with similar teeth in a sleeve 29 secured to the adjacent end of the shaft 14 as clearly shown in Figure 2. Upon inspection of Figure 5 it will be seen that the sleeve 27 is movable longitudinally upon the shaft but is prevented from rotating thereon through the medium of a cotter key 30 and the sleeve 27 is held in its outermost position by a coil spring 31 which surrounds the shaft 14 and has its end convolutions engaging a flange 32 on the sleeve 27 and a washer 33 which is held against movement by a cotter pin 34. The sleeve 29 is threadedly secured in its bearing 12 so that the same may be adjusted therein for varying the position of the teeth of the sleeve so that a step by step movement of the shaft 14 may also be varied.

Secured to the planter axle B adjacent one end thereof is a drive gear 35 which meshes with a drive pinion 36. The pinion 36 being secured to the shaft 13 whereby the latter is rotated through the medium of the drive gear 35 when the planter is propelled by any well known means.

From the above description and disclosure of the drawings, it will be apparent that the attachment can be accurately adjusted for dropping seeds at any desired distance apart, and the operation thereof may be briefly described as follows:

Assuming that the axle B is rotating, such rotation is transmitted to the shaft 13 through the instrumentality of the gear 35 and pinion 36. The shaft 13 having secured thereon the gear 25, the teeth thereof will strike the teeth of the pinion 26 for a step by step movement of the latter, and this last mentioned movement is transmitted to the shaft 14 which in turn revolves the seed valve 19. The shaft 14 is prevented from undue rotation by the slip connection of the sleeves 27 and 29, and it will also be noted that the teeth of the sleeve 29 may be adjusted with respect to the teeth 28. It will also be apparent that different size drive gears can be associated with the planter axle B, and the straps 6 and 7 can be adjusted so as to compensate for the different size gears so that the drive pinions 36 will mesh with the respective size gears.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

In a cotton planter and its axle, a pair of spaced substantially superimposed shafts interposed below the axle and adjustable vertically with respect thereto, a drive gear secured to said axle, a pinion meshing with said gear and secured to the uppermost shaft, a gearing secured to the shaft last mentioned adjacent one end thereof and being formed with teeth arranged in equidistantly spaced pairs, a pinion secured to the lowermost shaft and meshing with the teeth of said gear, the lowermost shaft being movable in a step by step rotation by the engagement of said teeth with the pinion, toothed sleeves surrounding the lowermost shaft and being associated in a manner to prevent undue rotation of the lowermost shaft, and one of said sleeves being adjustable whereby the step by step movement may be varied.

In testimony whereof I affix my signature.

GEORGE J. DEAN.